United States Patent
Chen et al.

(10) Patent No.: US 9,288,538 B2
(45) Date of Patent: Mar. 15, 2016

(54) METHODS AND APPARATUS FOR CONVEYING A DELIVERY SCHEDULE TO MOBILE TERMINALS

(75) Inventors: An Mei Chen, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1503 days.

(21) Appl. No.: 11/392,291

(22) Filed: Mar. 28, 2006

(65) Prior Publication Data

US 2006/0245441 A1 Nov. 2, 2006

Related U.S. Application Data

(60) Provisional application No. 60/669,553, filed on Apr. 7, 2005.

(51) Int. Cl.
| | |
|---|---|
| *H04B 1/16* | (2006.01) |
| *G06Q 10/00* | (2012.01) |
| *H04N 21/443* | (2011.01) |
| *H04L 12/18* | (2006.01) |
| *H04L 12/58* | (2006.01) |

(Continued)

(52) U.S. Cl.
CPC ........ *H04N 21/4436* (2013.01); *H04L 12/1881* (2013.01); *H04L 12/5895* (2013.01); *H04L 51/38* (2013.01); *H04L 67/325* (2013.01); *H04N 21/41407* (2013.01); *H04N 21/4334* (2013.01); *H04N 21/4532* (2013.01); *H04W 4/06* (2013.01); *H04W 52/0216* (2013.01); *H04W 72/005* (2013.01); *Y02B 60/50* (2013.01)

(58) Field of Classification Search
USPC .......................................................... 705/28
See application file for complete search history.

(56) References Cited

U.S. PATENT DOCUMENTS

| | | | |
|---|---|---|---|
| 5,560,021 A | 9/1996 | Vook et al. | |
| 6,085,170 A * | 7/2000 | Tsukuda | ............... A47G 29/141 705/26.1 |

(Continued)

FOREIGN PATENT DOCUMENTS

| | | |
|---|---|---|
| EP | 0955737 A2 | 11/1999 |
| EP | 0957597 A2 | 11/1999 |

(Continued)

OTHER PUBLICATIONS

International Search Report and Written Opinion—PCT/US06/012827, International Search Authority—European Patent Office, Aug. 9, 2006.

(Continued)

*Primary Examiner* — Ashford S Hayles
(74) *Attorney, Agent, or Firm* — The Marbury Law Group, PLLC (57) ABSTRACT

Methods and apparatus for conveying a delivery schedule to mobile terminals. In an aspect, a method is provided that includes receiving a contact window that describes a time interval when a content clip will be available on a distribution network, determining one or more clips of interest, determining that the content clip matches at least one of the one or more clips of interest, and scheduling a receive time to receive the content clip within the time interval. An apparatus is provided that includes scheduling logic configured to determine that a content clip matches one or more clips of interest and to schedule a receive time to receive the content clip within a contact window.

24 Claims, 7 Drawing Sheets

(51) Int. Cl.
   *H04N 21/414*  (2011.01)
   *H04N 21/433*  (2011.01)
   *H04N 21/45*   (2011.01)
   *H04W 4/06*    (2009.01)
   *H04W 52/02*   (2009.01)
   *H04L 29/08*   (2006.01)
   *H04W 72/00*   (2009.01)

(56) References Cited

U.S. PATENT DOCUMENTS

| | | | |
|---|---|---|---|
| 6,473,607 B1* | 10/2002 | Shohara | H04W 52/0216 340/7.32 |
| 6,553,239 B1 | 4/2003 | Langston | |
| 6,639,905 B1* | 10/2003 | Muller | H04W 88/022 340/4.2 |
| 6,647,389 B1* | 11/2003 | Fitch | H04H 20/12 |
| 6,700,902 B1 | 3/2004 | Meyer | |
| 6,707,809 B1 | 3/2004 | Warrier et al. | |
| 6,996,393 B2* | 2/2006 | Pyhalammi | H04L 12/14 375/220 |
| 7,043,557 B2* | 5/2006 | Mesarina | H04B 1/66 375/E7.013 |
| 7,054,612 B2* | 5/2006 | Patel | H04W 4/06 340/7.48 |
| 7,185,352 B2* | 2/2007 | Hallford | H04N 7/17309 348/E7.07 |
| 7,240,121 B2* | 7/2007 | Watanabe | H04N 7/17318 348/E5.008 |
| 7,386,603 B2* | 6/2008 | Shiba | G06Q 30/02 709/202 |
| 7,489,948 B2* | 2/2009 | Taromaru | H04B 7/0814 342/368 |
| 7,525,289 B2* | 4/2009 | Janik | G06F 17/30749 320/132 |
| 7,715,885 B2* | 5/2010 | Arunan | H04W 52/0216 455/41.2 |
| 7,895,615 B1* | 2/2011 | Godwin | H04H 60/11 386/239 |
| 7,958,457 B1* | 6/2011 | Brandenberg | G06F 1/1613 715/789 |
| 8,141,118 B2* | 3/2012 | Regan | H04H 20/426 725/100 |
| 2002/0002708 A1* | 1/2002 | Arye | H04N 21/23424 725/95 |
| 2002/0023092 A1* | 2/2002 | Tamura | G06Q 10/087 |
| 2002/0092019 A1 | 7/2002 | Marcus | |
| 2002/0100061 A1* | 7/2002 | Tsusaka | G06F 21/10 725/135 |
| 2003/0018775 A1* | 1/2003 | Shiba | G06Q 30/02 709/223 |
| 2003/0045273 A1* | 3/2003 | Pyhalammi | H04L 12/14 455/412.1 |
| 2003/0084108 A1* | 5/2003 | Syed | G06F 17/3089 709/206 |
| 2003/0105925 A1* | 6/2003 | Yoshimura | G06F 17/30902 711/118 |
| 2003/0135857 A1* | 7/2003 | Pendakur | H04N 7/165 725/61 |
| 2003/0153369 A1* | 8/2003 | Laiho | G06F 1/3203 455/574 |
| 2003/0157949 A1* | 8/2003 | Sarkkinen | H04L 12/189 455/503 |
| 2004/0043770 A1* | 3/2004 | Amit | H04L 12/1859 455/450 |
| 2004/0043797 A1* | 3/2004 | Shostak | H04W 52/0216 455/574 |
| 2004/0049393 A1* | 3/2004 | Duran | H04M 1/7255 704/275 |
| 2004/0131014 A1* | 7/2004 | Thompson, III | H04H 60/06 370/230 |
| 2004/0141490 A1* | 7/2004 | Hong | H04W 74/06 370/345 |
| 2004/0198390 A1* | 10/2004 | Kaise | G06Q 30/02 455/456.1 |
| 2004/0229605 A1* | 11/2004 | Hwang | H04W 68/00 455/426.1 |
| 2004/0236788 A1* | 11/2004 | Sato | G06F 21/10 |
| 2005/0021845 A1* | 1/2005 | Yasui | H04W 4/00 709/238 |
| 2005/0043060 A1* | 2/2005 | Brandenberg | G01S 5/02 455/558 |
| 2005/0050218 A1* | 3/2005 | Sheldon | H04L 29/06 709/231 |
| 2005/0058149 A1* | 3/2005 | Howe | H04L 47/10 370/428 |
| 2005/0058151 A1* | 3/2005 | Yeh | H04W 52/46 370/445 |
| 2005/0097624 A1* | 5/2005 | Salo | H04H 20/18 725/136 |
| 2005/0124313 A1* | 6/2005 | Simpson | H04W 24/10 455/343.3 |
| 2005/0125525 A1* | 6/2005 | Zhou | G06F 8/61 709/223 |
| 2005/0153714 A1* | 7/2005 | Subrahmanya | H04W 68/00 455/458 |
| 2005/0278750 A1* | 12/2005 | Grossman | G06Q 30/02 725/62 |
| 2006/0020972 A1* | 1/2006 | Regan | H04H 20/426 725/46 |
| 2006/0023748 A1* | 2/2006 | Chandhok | H04L 29/06027 370/469 |
| 2006/0063567 A1* | 3/2006 | Grossman | H04M 1/72522 455/566 |
| 2006/0072509 A1* | 4/2006 | Lindoff | H04W 72/005 370/332 |
| 2006/0104348 A1* | 5/2006 | Chen | H04H 40/18 375/240.01 |
| 2006/0126556 A1* | 6/2006 | Jiang | H04L 12/18 370/328 |
| 2006/0135179 A1* | 6/2006 | Aaltonen | H04L 67/06 455/456.3 |
| 2006/0194549 A1* | 8/2006 | Janik | G06F 17/30749 455/73 |
| 2006/0218604 A1* | 9/2006 | Riedl | H04N 5/913 725/91 |
| 2006/0245441 A1* | 11/2006 | Chen | H04L 12/1881 370/401 |
| 2006/0259924 A1* | 11/2006 | Boortz | H04N 5/44543 725/32 |
| 2006/0274698 A1* | 12/2006 | Twitchell, Jr. | H04W 36/14 370/331 |
| 2007/0053513 A1* | 3/2007 | Hoffberg | G06K 9/00369 380/201 |
| 2007/0244818 A1* | 10/2007 | Tsuji | H04L 29/06027 705/51 |
| 2008/0126476 A1* | 5/2008 | Nicholas | G06Q 10/10 709/203 |
| 2008/0259895 A1* | 10/2008 | Habetha | H04W 74/04 370/345 |
| 2009/0029685 A1* | 1/2009 | Willis | H04L 67/04 455/414.1 |
| 2009/0258683 A1* | 10/2009 | Gielow | H04L 29/06027 455/575.1 |
| 2009/0298490 A9* | 12/2009 | Janik | H04L 12/2856 455/419 |
| 2010/0257052 A1* | 10/2010 | Zito | G06Q 30/02 705/14.45 |
| 2011/0090831 A1* | 4/2011 | Howard | H04W 52/0225 370/311 |
| 2011/0244868 A1* | 10/2011 | Senarath | H04W 36/18 455/442 |

FOREIGN PATENT DOCUMENTS

| | | |
|---|---|---|
| EP | 1 435 751 A1 | 7/2004 |
| JP | 200031921 | 1/2000 |
| JP | 2000184338 | 6/2000 |
| JP | 2001111994 A | 4/2001 |
| JP | 2001154958 | 6/2001 |

(56) References Cited

FOREIGN PATENT DOCUMENTS

| KR | 200347698 | 6/2003 |
|----|-----------|--------|
| RU | 2073913 C1 | 2/1997 |
| TW | 448648 | 8/2001 |
| TW | 200307415 | 12/2003 |
| WO | WO 2004/017581 A1 | 2/2004 |

OTHER PUBLICATIONS

Taiwanese Search Report—TW095112570—Search Authority—TIPO—Aug. 10, 2009.
Luby, et al., "FLUTE—File Delivery over Unidirectional Transport", IETF RFC 3926, pp. 1-35, (Oct. 2004).

* cited by examiner

METHODS AND APPARATUS FOR CONVEYING A DELIVERY SCHEDULE TO MOBILE TERMINALS

CLAIM OF PRIORITY UNDER 35 U.S.C. §119

The present Application for Patent claims priority to Provisional Application No. 60/669,553, filed Apr. 7, 2005, and assigned to the assignee hereof and hereby expressly incorporated by reference herein.

BACKGROUND

1. Field

The present application relates generally to the operation of data networks, and more particularly, to methods and apparatus for conveying a delivery schedule to mobile terminals.

2. Background

Data networks, such as wireless communication networks, have to trade off between services customized for a single terminal and services provided to a large number of terminals. For example, the distribution of content to a large number of mobile terminals (subscribers) is a complicated problem. This is especially true for mobile terminals that communicate using relatively slow speed over-the-air communication links. Therefore, it is very important for content providers to have a way to deliver content to a variety of mobile terminals in a way that conserves device power and network resources.

In conventional wired content delivery/media distribution systems, the scheduled broadcast time of real-time or streaming services is known or set. The broadcast time is set to be the time at which the content is advertised to the user as available for viewing. However, in a clip-casting service, a content clip can be delivered to a device at any time as long as it is delivered before the advertised viewing time. The viewing time is defined as the time at which the content clip is advertised to the user as being available for viewing. Once a user has subscribed to a clip-casting service, the delivery of the content clips is performed transparently in the background without requiring any user interaction. The content clips are stored at the device and are made available for viewing at specified times.

Unfortunately, conventional systems have several disadvantages when trying to deliver content clips to mobile devices. As in traditional IP multicast or other broadcast models, a mobile device can open one or more IP multicast sockets and listen for clips to arrive on the IP multicast sockets. However, this means that a mobile device needs to stay awake all the time to see if there is content arriving (being delivered) for the clip-casting service. Unfortunately, this conventional multicast content reception model does not work well in a mobile environment because mobile devices have limited battery life. Thus, requiring mobile devices to stay awake to listen for content to be received on the multicast sockets would consume significant battery power and reduce mobile standby times.

Therefore, what is needed is a way to deliver content clips to mobile devices that allows the content clips to be efficiently received while conserving device battery power and thereby minimizing the impact on standby times.

SUMMARY

In one or more embodiments, a delivery system, comprising methods and apparatus, is provided that operates to deliver a clip delivery schedule to mobile devices. In an embodiment, the clip delivery schedule is delivered in an information message and comprises contact windows that identify when media clips or other content will be available on a delivery network. Once the clip delivery schedule is received at a mobile device, the device can determine when clips are of interest will be available, and then schedule itself to wake up to receive those clips for later viewing by the device operator. Because embodiments of the delivery system allow a device to remain in sleep mode until clips of interest become available, device battery power can be conserved.

In an aspect, a method for providing a clip delivery schedule is provided. The method comprises receiving a contact window that describes a time interval when a content clip will be available on a distribution network, and determining one or more clips of interest. The method also comprises determining that the content clip matches at least one of the one or more clips of interest, and scheduling a receive time to receive the content clip within the time interval.

In another aspect, an apparatus for providing a clip delivery schedule is provided. The apparatus comprises communication logic configured to receive a contact window that describes a time interval when a content clip will be available on a distribution network. The apparatus also comprises processing logic configured to determine one or more clips of interest, and scheduling logic configured to determine that the content clip matches at least one of the one or more clips of interest, and to schedule a receive time to receive the content clip within the time interval.

In another aspect, an apparatus for providing a clip delivery schedule is provided. The apparatus comprises means for receiving a contact window that describes a time interval when a content clip will be available on a distribution network, and means for determining one or more clips of interest. The apparatus also comprises means for determining that the content clip matches at least one of the one or more clips of interest, and means for scheduling a receive time to receive the content clip within the time interval.

In another aspect, a computer-readable medium is provided having a computer program, which when executed by at least one processor, operates to provide a clip delivery schedule. The computer program comprises instructions for receiving a contact window that describes a time interval when a content clip will be available on a distribution network, and instructions for determining one or more clips of interest. The computer program also comprises instructions for determining that the content clip matches at least one of the one or more clips of interest, and instructions for scheduling a receive time to receive the content clip within the time interval.

In another aspect, at least one processor is provided that is configured to perform a method for providing a clip delivery schedule. The method comprises receiving a contact window that describes a time interval when a content clip will be available on a distribution network, and determining one or more clips of interest. The method also comprises determining that the content clip matches at least one of the one or more clips of interest, and scheduling a receive time to receive the content clip within the time interval.

In another aspect, a method for providing a clip delivery schedule is provided. The method comprises generating a contact window that describes when a content clip will be available on a distribution network, and generating a reception parameter. The method also comprises incorporating the contact window and the reception parameter into an information message, and transmitting the information message.

In another aspect, an apparatus for providing a clip delivery schedule is provided. The apparatus comprises a contact window generator configured to generate a contact window that describes when a content clip will be available on a distribution network, and to generate a reception parameter. The apparatus also comprises processing logic configured to incorporate the contact window and the reception parameter into an information message, and communication logic configured to transmit the information message.

In another aspect, an apparatus for providing a clip delivery schedule is provided. The apparatus comprises means for generating a contact window that describes when a content clip will be available on a distribution network, and means for generating a reception parameter. The apparatus also comprises means for incorporating the contact window and the reception parameter into an information message, and means for transmitting the information message.

In another aspect, a computer-readable medium is provided having a computer program, which when executed by at least one processor operates to provide a clip delivery schedule. The computer program comprise instructions for generating a contact window that describes when a content clip will be available on a distribution network, and instructions for generating a reception parameter. The computer program also comprises instructions for incorporating the contact window and the reception parameter into an information message, and instructions for transmitting the information message.

In another aspect, at least one processor is provided that is configured to perform a method for providing a clip delivery schedule. The method comprises generating a contact window that describes when a content clip will be available on a distribution network, and generating a reception parameter. The method also comprises incorporating the contact window and the reception parameter into an information message, and transmitting the information message.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DESCRIPTION

In one or more embodiments, a delivery system is provided that operates to provide a flexible and efficient mechanism for conveying a clip delivery schedule to mobile devices. In an embodiment, the clip delivery schedule comprises contact windows that identify when multimedia clips or other content will be available over a distribution network to authorized mobile devices. Devices interested in receiving a particular clip may schedule reception of the clip during the appropriate contact window. The device may then operate to conserve power until the clip is scheduled for delivery. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

In an embodiment, the clip delivery schedule is conveyed as part of an information message (or "system information") that is delivered to mobile devices on a distribution network. Because the clip delivery schedule allows the devices to schedule the reception of a particular clip, the delivery system eliminates the need for mobile devices to waste power actively monitoring the distribution network waiting for particular clips to become available. As a result, device battery power can be conserved.

Figure 1:
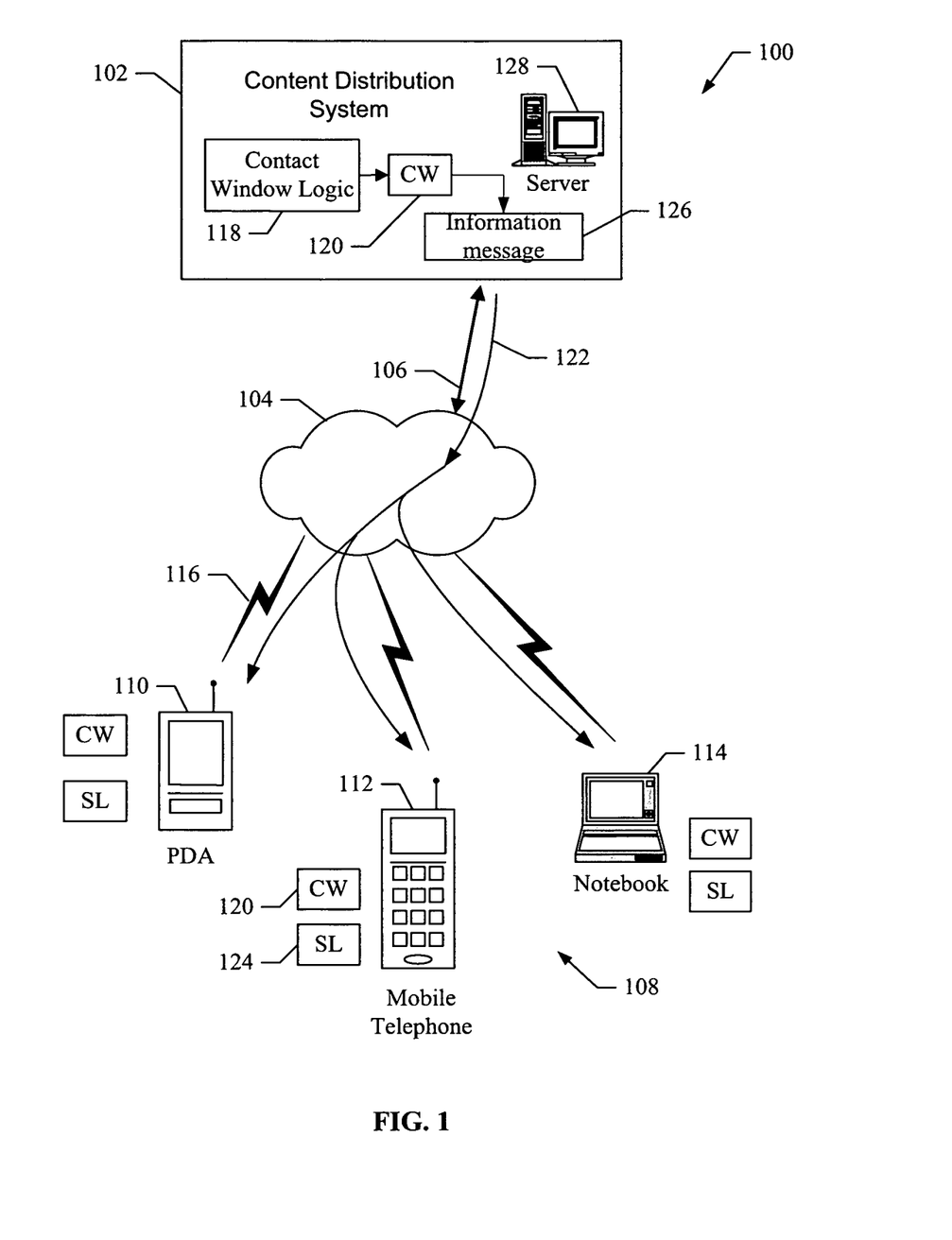
FIG. 1 shows a network that comprises an embodiment of a delivery system.

FIG. 1 shows a network 100 that comprises an embodiment of a delivery system. The network 100 comprises a content distribution system 102 that operates to distribute content over a distribution network 104. For example, the content distribution system 102 comprises a server 128 that communicates with the network 104 using the communication link 106, which comprises any suitable type of communication technology. The content distribution system 102 delivers content in the form of multimedia clips or other content that is associated with one or more services. The network 104 may comprise any type of wired and/or wireless networks. The network 104 is in communication with various authorized mobile devices 108. For example, the devices 108 comprise a PDA 110, a mobile telephone 112, and a notebook computer 114. The network 104 communicates with the devices 108 using wireless communication links 116 that comprise any suitable wireless communication technology. Thus, the distribution network 104 is operable to deliver content clips to any type and/or number of authorized mobile devices.

In an embodiment, the server 128 comprises contact window logic 118, which operates to generate contact windows (CW) 120 that identify a time interval when selected clips are to be available over the network 104. For example, the contact windows 120 define a time interval wherein one or more clips are available to authorized devices on the network 104. The contact windows 120 are part of a clip delivery schedule that is incorporated into an information message 126 and transmitted to the devices 108, as shown by path 122. In an embodiment, the information message 126 is transmitted to device using any suitable type of overhead or other dedicated information channel.

The contact window logic 118 uses information available at the content distribution system 102 to generate the contact windows 120. In an embodiment, a contact window comprises the following information.

| | |
|---|---|
| Contact window start time | The time at which a device can contact the network to download a particular multimedia clip. |
| Contact window duration | The time interval during which the multimedia clip is available after the contact window start time. |
| Subscribed memory | The amount of memory required to store the multimedia clip at a device. |

In an embodiment, the contact window logic 118 also generates a reception parameter that is associated with one or more contact windows. The reception parameter describes a time interval within a contact window in which a device should not attempt to obtain the content clip. For example, the reception parameter identifies a percentage of the contact window, for instance 10%. A device attempting to obtain a content clip should not do so within the last 10% of the contact window. For example, the reception parameter allows a device to conserve power since it may not be able to successfully receiving the content clip within 10% of the contact window.

In an embodiment, authorized devices, such as the mobile telephone 112 comprise scheduling logic (SL) 124. The scheduling logic 124 operates to extract the contact windows 120 from the information message and determine if the contact windows 120 are associated with content clips of interest. For example, the scheduling logic 124 operates to interact with a device user to determine clips of interest. In another embodiment, clips of interest are determined from the device's current subscription status. If a clip of interest is detected, the scheduling logic 124 operates to schedule a device "wake up" to receive that clip during the contact window associated with that clip. For example, if the mobile telephone 112 is in a power-down standby mode when a clip of interest becomes available on the network 104, the scheduled wake up causes the mobile telephone 112 to power up to receive the clip of interest. The clip is then stored at the mobile telephone 112 and presented to the device user at a later presentation or "viewing" time.

Thus, embodiments of the delivery system operate to generate contact windows that identify when selected content clips are available on a distribution network. The contact windows are part of a delivery schedule that is wirelessly conveyed to mobile devices in an information message. When the information message is received by a mobile device, scheduling logic at the device determines when any clips of interest are to be delivered and schedules a device "wake up." The scheduled wake up allows the device to wake up from a sleep mode to receive the clip of interest when it becomes available. Thus, the delivery system operates to provide a flexible and efficient system for conveying a delivery schedule to mobile devices, and allowing those devices to conserve battery power until clips of interest become available on a distribution network. It should be noted that the network 100 illustrates just one implementation and that other implementations are possible within the scope of the embodiments.

Figure 2:
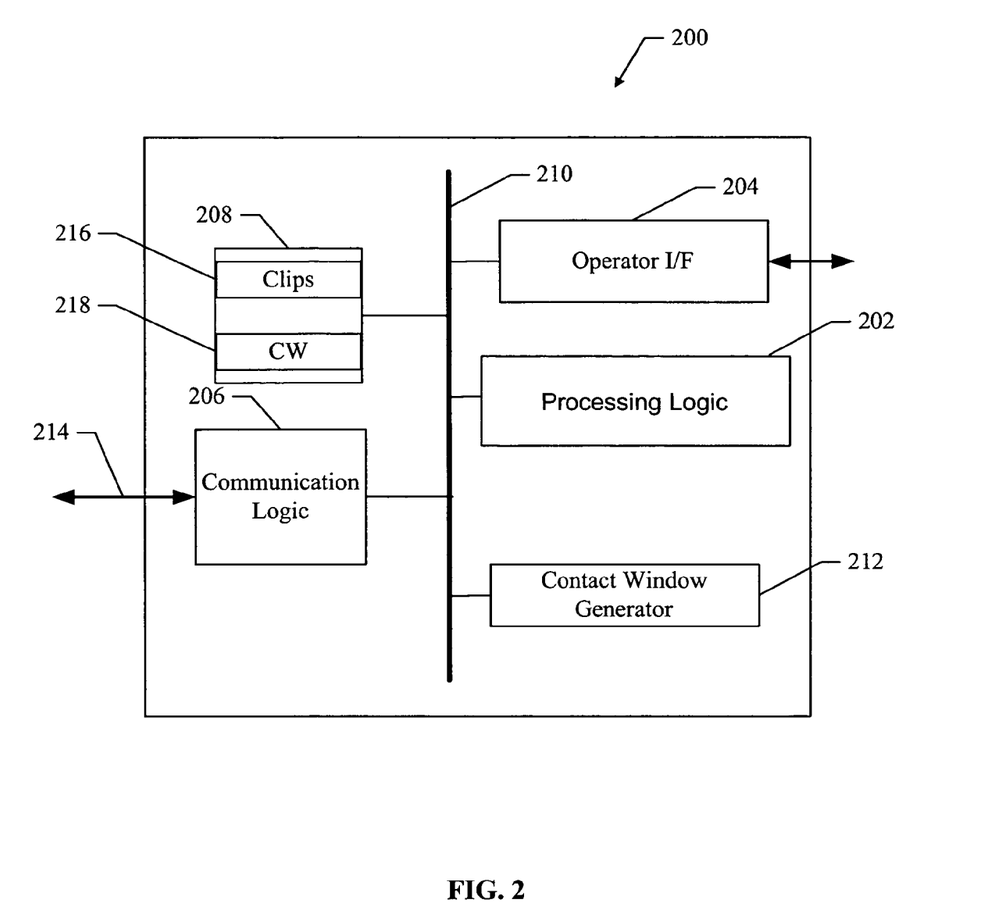
FIG. 2 shows an embodiment of a server for use in a delivery system.

FIG. 2 shows an embodiment of a server 200 for use in a delivery system. For example, the server 200 is suitable for use as the server 128 shown in FIG. 1. The server 200 comprises processing logic 202, operator interface I/F logic 204, communication logic 206, memory 208, and contact window generator 212 all coupled to a data bus 210.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control or communicate with one or more other functional elements of the server 200 via the internal data bus 210.

The communication logic 206 comprises hardware logic and/or software that operate to allow the server 200 to transmit and receive content clips, contact windows, and/or other information with remote devices or systems using communication link 214. For example, the communication link 214 comprises any suitable type of communication link to allow the server 200 to communicate contact window parameters with other entities of a content distribution system.

The memory 208 comprises any suitable memory device operable to store any type of information. For example, the memory 208 may comprise RAM, Flash memory, EEPROM, hard disk, and/or any other type of storage device. In an embodiment, the memory 208 operates to store one or more content clips 216 to be distributed over a distribution network, and one or more contact windows 218 that are generated as part of the operation of the server 200.

The operator I/F 204 comprises hardware logic and/or software that operate to allow the server 200 to interact with an operator to receive one or more parameters that are used in embodiments of the delivery system. For example, in one or more embodiments, the operator I/F 204 is used to receive operator inputs, or parameters, that are used during operation of the server 200 to generate the contact windows 218.

The contact window generator 212 comprises a CPU, processor, gate array, hardware logic, memory elements, virtual machine, software, and/or any combination of hardware and software. In one or more embodiments, the contact window generator 212 operates to receive various parameters (i.e., operator inputs) to generate the contact windows 218. A more detailed description of the contact windows 218 is provided in another section of this document.

During operation, the server 200 operates to obtain the clips 216 and/or information about the clips 216 from other entities in a content distribution system using the communication logic 206 and communication link 214. In an embodiment, information about the clips is obtained from operator inputs that are received through the operator I/F 204. The information comprises delivery schedule information that describes the distribution of the clips 216 on a distribution network. The contact window generator 212 operates to use this information to generate the contact windows 218 that describe windows in which selected clips will become available on the distribution network.

The processing logic 202 operates to incorporate the contact windows 218 into one or more information messages. For example, the information messages are used to communicate delivery system information to devices on a distribution network. In an embodiment, the processing logic 202 operates to include the contact windows 218 in a delivery schedule that is conveyed to mobile devices on a network as part of an information message. For example, the information message is transmitted by the communication logic 206 using the communication link 214.

In an embodiment, the delivery system comprises a computer program having one or more program instructions ("program instructions") stored on a computer-readable medium, which when executed by at least one processor, for instance, the processing logic 202, provides the functions described herein. For example, the program instructions may be loaded into the server 200 from a computer-readable medium, such as a floppy disk, CDROM, memory card, FLASH memory device, RAM, ROM, or any other type of memory device or computer-readable medium that interfaces to the server 200. In another embodiment, the program instructions may be downloaded into the server 200 from an external device or network resource. The program instructions, when executed by the processing logic 202, provide embodiments of a delivery system as described herein.

Thus, the server 200 operates to provide a flexible and efficient mechanism for generating contact windows that are part of a delivery schedule conveyed to mobile devices on a distribution network. It should be noted that the contact window logic 200 illustrates just one implementation and that other implementations are possible within the scope of the embodiments.

Figure 3:
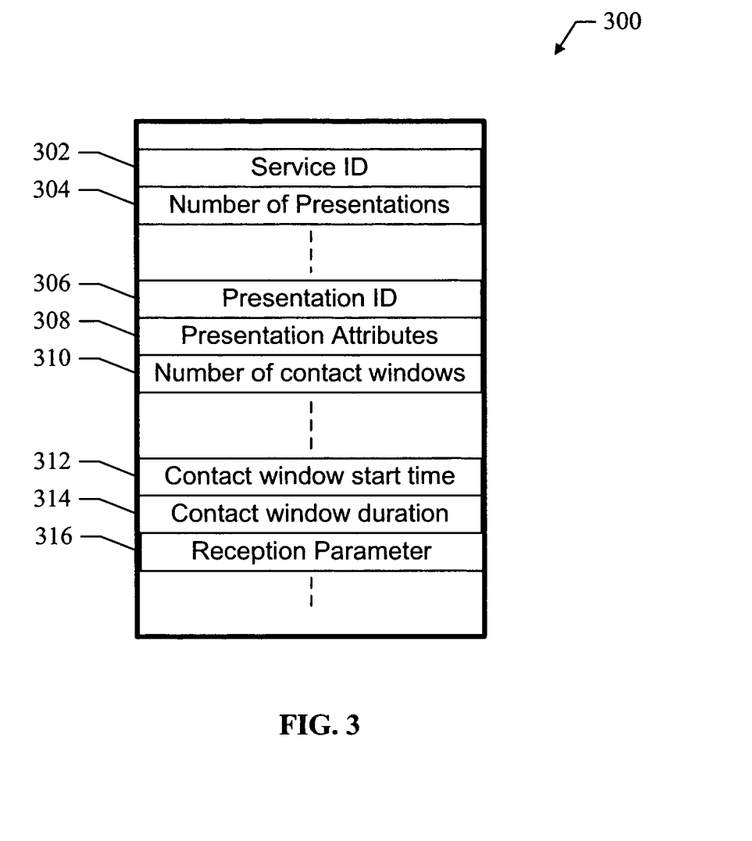
FIG. 3 shows an embodiment of contact window parameters for use in a delivery system.

FIG. 3 shows an embodiment of contact window parameters 300 for use in a delivery system. For example, the parameters 300 may be the parameters 218 shown in FIG. 2. In an embodiment, the delivery system conveys the contact window parameters 300 to mobile devices as part of an information message. The contact window parameters 300 indicate that for the given service ID, there can be one or more presentations (i.e., content clips) to be delivered. For each presentation, there can be one or more contact windows. Thus, the parameters 300 identify contact windows for one or more presentations that are associated with one or more services. For example, a service identifier (ID) 302 is provided that identifies a particular service that is associated with one or more presentations of selected content clips. For the service 302, a number of presentations parameter 304 is provided that indicates how many presentations will occur. For example, a service many have any number of clip presentations associated with it.

For each service there is at least one presentation ID 306 that identifies a particular presentation. The presentation ID 306 has associated presentation attributes 308 which may describe the presentation, memory requirements, or other attributes of the presentation. Furthermore, for each presentation there is a number of contact windows parameter 310 that identifies the number of contact windows in which the presentation can be received from a distribution network. For example, any content clip may be available on the distribution network during one or more contact windows. It should be noted that there may be multiple presentations associated with any particular service.

A contact window start time parameter 312 is provided that identifies a start time of a contact window associated with a particular presentation. A contact window duration time parameter 314 is provided that identifies a duration time of the contact window. A reception parameter 316 is provided that indicates a time interval in a contact window in which a device should not attempt to receive a content clip. For example, the reception parameter 316 may be a percentage indicator that indicates a portion of the contact window (located at the end of the contact window) in which a device should not attempt to receive a content clip. For example, the reception parameter 316 indicates a point in time within the contact window, after which, not enough time remains in the contact window to successfully receive a content clip.

In an embodiment, there may be multiple instances of the parameters 312, 314, and 316 to define multiple contact windows in which a particular presentation will be available on a distribution network. Additional parameters may also be provided, such as a memory parameter that indicates the amount of memory a device needs to have to store a particular presentation.

Therefore, in one or more embodiments, the contact window parameters 300 operate to provide contact window information that can be used by a device to determine when selected content clips will be available on a distribution network. It should be noted that the parameters 300 represent just one implementation and that other implementations are possible within the scope of the embodiments.

Figure 4:
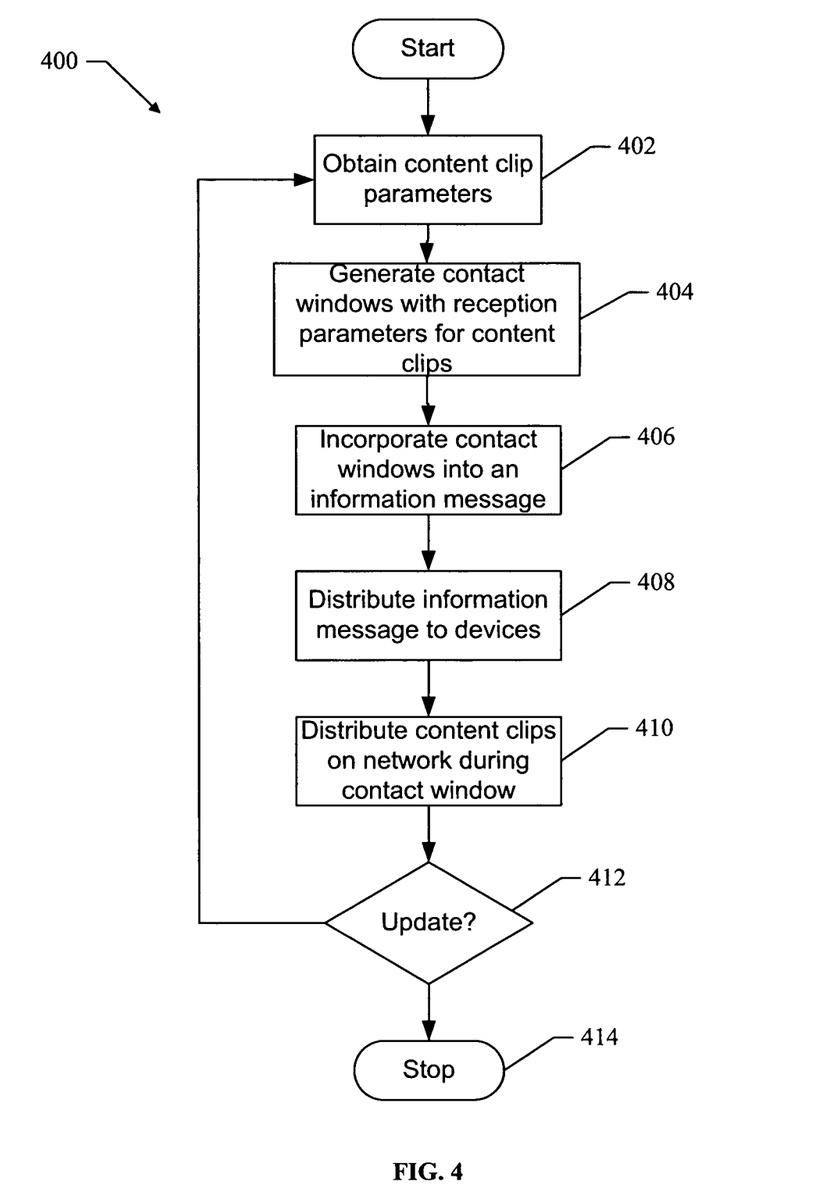
FIG. 4 shows an embodiment of a method for providing contact windows for use in a delivery system.

FIG. 4 shows an embodiment of a method 400 for providing contact windows for use in a delivery system. For example, the method 400 is suitable for use by the server 200 to provide one embodiment of a delivery system. For clarity, the method 400 is described herein with reference to the server 200 shown in FIG. 2.

At block 402, content clip parameters are obtained. For example, various parameters for one or more content clips associated with one or more services are obtained by the processing logic 202. In an embodiment, the processing logic 202 communicates with other distribution system entities through the communication logic 206 to obtain the clip parameters. In another embodiment, the processing logic 202 communicates with an operator through the operator I/F 204 to obtain the clip parameters. In an embodiment, the clip parameters comprise information relating to the availability of selected content clips on a distribution network. For example, an operator may specify through the operator I/F 204 that a selected content clip is to be available each day at a designated time for one hour over the course of one week. The obtained parameters may be stored in the memory 208 and associated with any of the clips 216.

At block 404, contact window parameters and reception parameters are generated for one or more content clips. For example, the contact window generator 212 operates to process the obtained clip parameters to generate one or more contact window parameters for each content clip. The contact window parameters also include one or more reception parameters. For example, the contact window parameters and reception parameters are formatted like the contact window parameters 300 shown in FIG. 3. The generated contact window parameters are then stored in the memory, as shown at 218.

At block 406, the generated contact window parameters are incorporated into an information message. For example, the information message comprises system information that provides the latest distribution system updates to devices on a distribution network. In an embodiment, the processing logic 202 operates to incorporate the contact windows 218 into the information message. In another embodiment, the contact window parameters are incorporated into an information message by other entities of a distribution system.

At block 408, the information message is distributed to devices on a distribution network. For example, the processing logic 202 controls the communication logic 206 to broadcast the information message on the distribution network using the communication link 214. For example, the information message may be transmitted over an overhead channel or other dedicated information channel. In another embodiment, the information message is transmitted by other entities of a distribution system.

At block 410, content clips are distributed on the distribution network during the specified contact windows. For example, the processing logic 202 operates to control the communication logic 206 to distribute one or more content clips 216 over the distribution network during selected contact windows. For example, each clip is associated with one or more contact windows and the processing logic 202 operates to distribute each clip during its corresponding contact window so that any device interested in receiving a particular clip can do so during its contact window. In another embodiment, the content clips are distributed on the distribution network by other entities of a distribution system.

At block 412, a test is performed to determine if there are any new clip parameters that may add, change, delete, or otherwise modify the contact windows associated with any content clips. For example, new operator inputs may be received through the operator I/F 204 that would cause new contact windows to be generated. If there are new parameters the method proceeds to block 402 to obtain those parameters and generate new contact windows. If there are no new parameters, the method ends at block 414.

Thus, the method 400 operates to provide contact windows for use in embodiments of a delivery system. It should be noted that the method 400 is just one implementation and that other implementations are possible within the scope of the embodiments. For example, any of the functions of the method 400 may be added to, changed, deleted, modified, combined, or otherwise adjusted within the scope of the embodiments.

Figure 5:
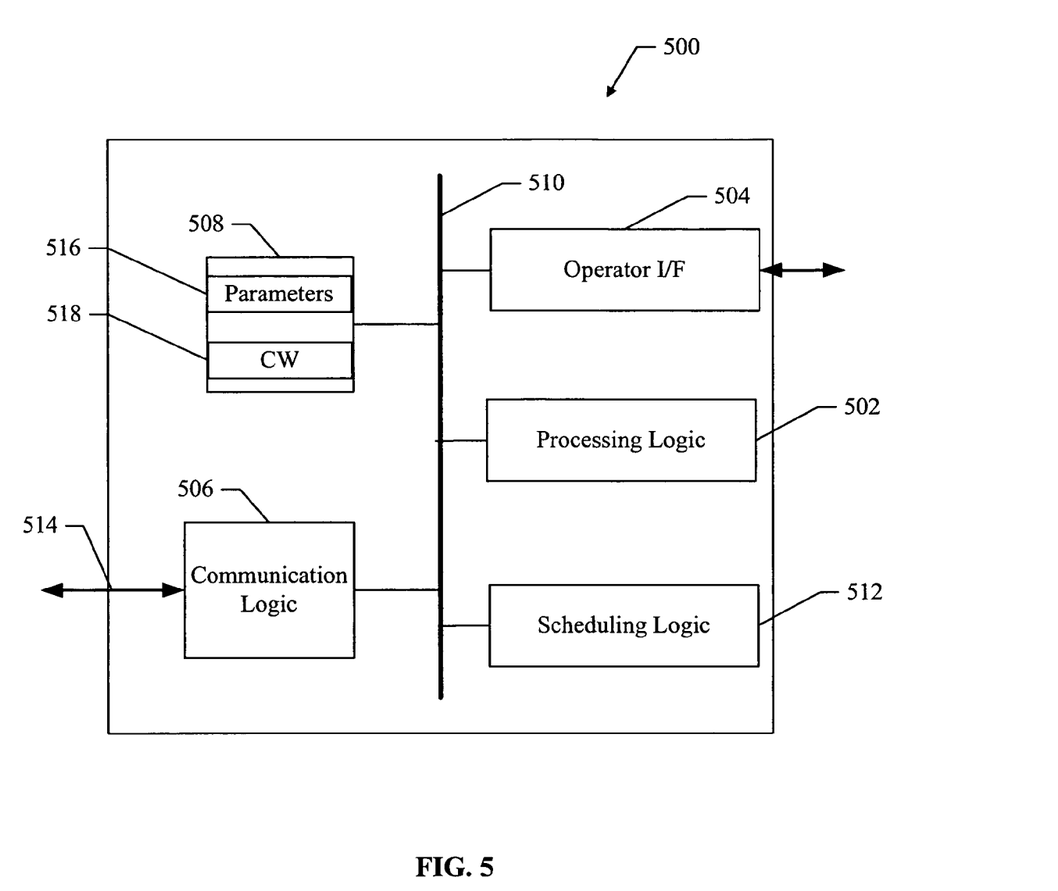
FIG. 5 shows an embodiment of a mobile device that operates to receive a delivery schedule in a delivery system.

FIG. 5 shows an embodiment of a mobile device 500 that operates to receive a clip delivery schedule in a delivery system. For example, the device 500 is suitable for use as the device 112 shown in FIG. 1. The device 500 comprises processing logic 502, operator interface I/F logic 504, communication logic 506, and memory 508 all coupled to a data bus 510. The device 500 also comprises content scheduling logic 512, which is also coupled to the data bus 510.

In one or more embodiments, the processing logic 502 comprises a CPU, processor, gate array, hardware logic, memory elements, virtual machine, software, and/or any combination of hardware and software. Thus, the processing logic 502 generally comprises logic to execute machine-readable instructions and to control or communicate with one or more other functional elements of the device 500 via the internal data bus 510.

The communication logic 506 comprises hardware logic and/or software that operate to allow the device 500 to transmit and receive content clips, contact windows, and/or other information with remote devices or systems using communication link 514. For example, in an embodiment, the communication link 514 comprises any suitable type of communication link to allow the device 500 to receive an information message over a wireless communication link that comprises one or more contact window parameters, content clips or other information from distribution network.

The memory 508 comprises any suitable memory device operable to store any type of information. For example, the memory 508 may comprise RAM, Flash memory, EEPROM, hard disk, and/or any other type of storage device. In an embodiment, the memory 508 operates to store one or more receiving parameters 516, and one or more contact windows 518. In an embodiment, the receiving parameters 516 comprise parameters that identify content clips of interest to the device 500.

The operator I/F 504 comprises hardware logic and/or software that operate to allow the device 500 to interact with an operator to receive one or more parameters that are used in embodiments of the delivery system. For example, in one or more embodiments, the operator I/F 504 is used to receive operator inputs, or parameters, that are used during operation of the delivery system to determine content clips of interest. For example, the received parameters may be the parameters 516.

The scheduling logic 512 comprises a CPU, processor, gate array, hardware logic, memory elements, virtual machine, software, and/or any combination of hardware and software. In one or more embodiments, the scheduling logic 512 operates to receive various parameters (i.e., operator inputs) to determine content clips of interest. In an embodiment, the scheduling logic 512 determines clips of interest based on subscription information stored at the device 500.

During operation, the device 500 operates to receive an information message comprising a clip delivery schedule that describes one or more content clips having one or more contact windows. The scheduling logic 512 determines clips of interest from operator inputs or based on subscribed services. By comparing information about the clips of interest with information about available clips in the clip delivery schedule, the scheduling 512 determines if any clips of interest will be available on a distribution network. If clips of interest will be available, the scheduling logic 512 operates to schedule a device wake up, so that the device may receive those clips during the appropriate contact window. Any received clips of interest are stored in the memory 508 for later viewing.

In an embodiment, the scheduling logic 512 operates to process any reception parameters that are associated with any contact windows. For example a reception parameter may indicate a point in time within a contact window after which the device 500 should not attempt to receive a content clip. The scheduling logic 512 operates to determine if a reception parameter is included with a contact window, and if so, operates to schedule the reception of a content clip within the contact window but before the point in time indicated by the reception parameter. Thus, the clip can be successfully received by the device 500.

In an embodiment, the delivery system comprises a computer program having one or more program instructions ("program instructions") stored on a computer-readable medium, which when executed by at least one processor, for instance, the processing logic 502, provides the functions described herein. For example, the program instructions may be loaded into the device 500 from a computer-readable medium, such as a floppy disk, CDROM, memory card, FLASH memory device, RAM, ROM, or any other type of memory device or computer-readable medium that interfaces to the device 500. In another embodiment, the program instructions may be downloaded into the device 500 from an external device or network resource. The program instructions, when executed by the processing logic 502, provide embodiments of a delivery system as described herein.

Thus, the device 500 operates to provide a flexible and efficient mechanism for receiving a clip delivery schedule in an information message, determining if there are content clips of interest in the delivery schedule, scheduling a wake up during selected contact windows accounting for any reception parameters, and receiving clips of interest for later viewing. It should be noted that the device 500 illustrates just one implementation and that other implementations are possible within the scope of the embodiments.

Figure 6:
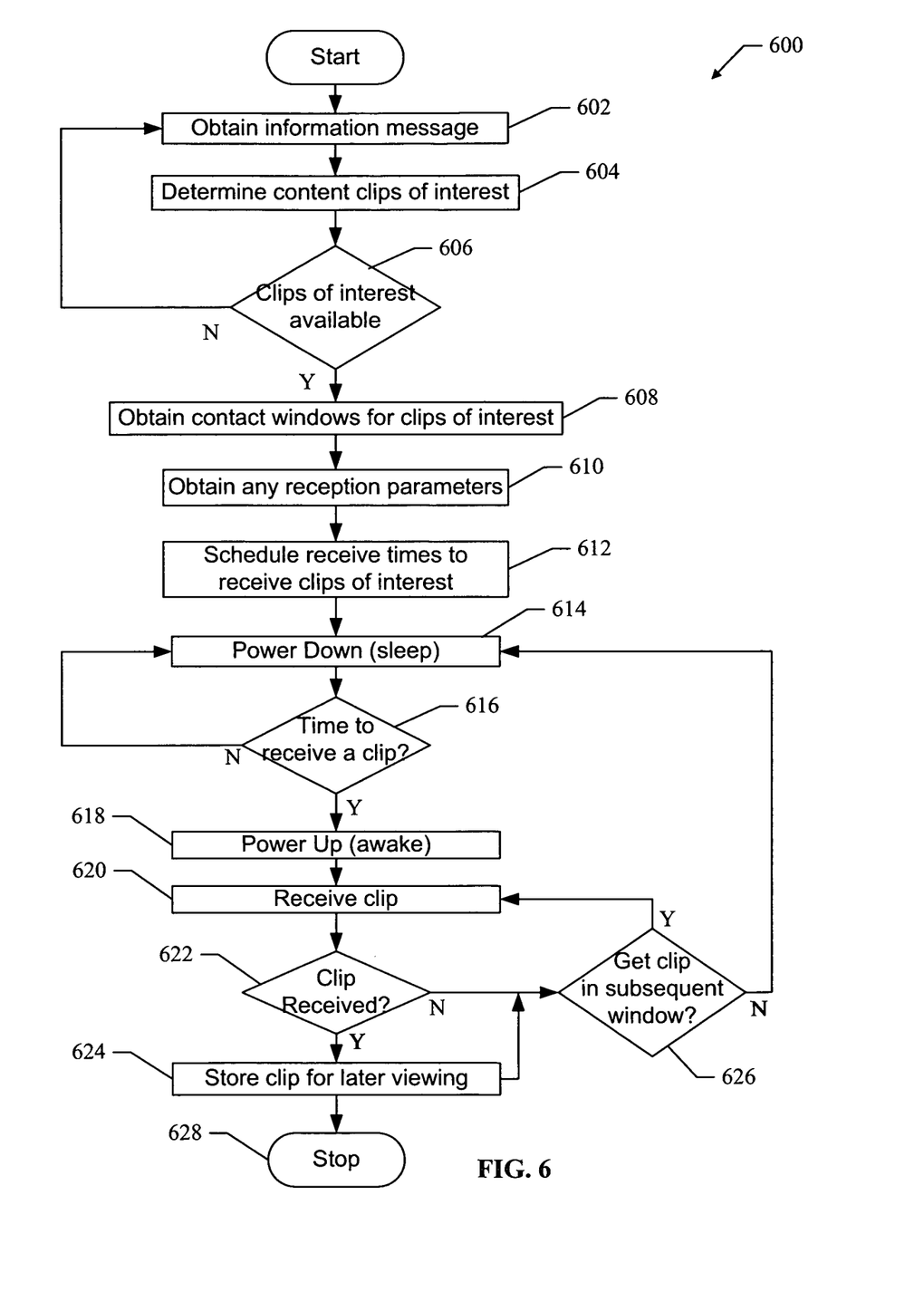
FIG. 6 shows an embodiment of a method for operating a device for use in a delivery system.

FIG. 6 shows one embodiment of a method 600 for operating a device for use in a delivery system. For example, the method is suitable for use by the device 500 shown in FIG. 5. For clarity the method 500 is described herein with reference to the device 500.

At block 602, an information message is obtained by the device 500. For example, the information message is received in a wireless transmission by the communication logic 506. The information message comprises a clip delivery schedule that describes content clips that are associated with one or more contact windows. In an embodiment, the contact windows are formatted as shown in FIG. 3.

At block 604, content clips of interest are determined. In an embodiment, scheduling logic 512 operates to determine content clips of interest. For example, the scheduling logic 512 receives operator input through the operator I/F 504 and uses this input (i.e., parameters 516) to determine content clips that are of interest to the device user. In another embodiment, the scheduling logic 512 processes service subscription parameters stored at the device that describe the device's current subscription status and uses this information to determiner content clips of interest. For example, content clips related to a subscribed service are flagged as content clips of interest.

At block 606 a test is performed to determine if clips described in the information message match any of the clips of interest. In an embodiment, the content scheduling logic 512 operates to compare identifiers related to the determined clips of interest to identifiers in the clip delivery schedule provided in the information message. For example, service identifiers in the contact window parameters 300 may match service identifiers associated with determined clips of interest. If a match occurs, then clips identified in the information message are to be received and the method proceeds to block 608. If a match does not occur, then clips of interest are not available and the method proceeds to block 602. It should be noted that any technique or process may be used to determine if the contact window parameters in the received information message describe clips of interest to the device. In another embodiment, the contact window parameters are used to determine if any particular content clip already exists on the device. If it is determined that a clip in the received clip delivery schedule already exist on the device, the method proceeds to block 602.

At block 608, contact windows for the clips to be received are obtained. In an embodiment, the scheduling logic 512 operates to obtain the contact windows for the clips to be received from the information message and stores the contact windows in the memory 508, as shown at 518.

At block 610, reception parameters for the clips to be received are obtained. In an embodiment, the scheduling logic 512 operates to obtain the reception parameters from the information message and store the reception parameters in the memory 508.

At block 612, one or more receive times (or wake up times) are scheduled so that the device can receive content clips of interest. For example, the scheduling logic 512 operates to schedule the receive time to occur within a contact window associated with the content clip to be received. In an embodiment, the reception parameters are used to determine a time interval within a contact window in which retrieval of a clip should be attempted. For example, the reception parameters indicate a portion of the contact window during which a device should not attempt to retrieve a content clip because there may not be enough time remaining in the contact window to successfully retrieve the clip. Thus, the scheduling logic 512 operates to schedule the device receive time so that the clip can be successfully received.

At block 614, the device enters a power-down sleep (standby) mode to conserve battery power. For example, the processing logic 502 operates to place the device in the power down mode. In this mode, the device is still able to wake up at selected times to receive content clips.

At block 616, a test is performed to determine if the device should power up to receive one or more content clips. In an embodiment, the processing logic 502 operates to determine if the device needs to wake up to receive a content clip. For example, the processing logic 502 operates to determine if the current time matches a scheduled receive time that is associated with one or more contact windows. If the device does not need to wake up, the method proceeds to block 614. If the device does need to wake up, the method proceeds to block 618.

At block 618, the device powers up within a selected contact window to receive a selected content clip. For example, the processing logic 502 operates to power up the communication logic 506 to receive a content clip from a distribution network.

At block 620, one or more content clips are received. For example, the content clip is transmitted over a distribution network and the communication logic 506 operates to receive the content clip in a wireless transmission using the communication link 514.

At block 622, a test is performed to determine if the device received the content clip during the contact window. In an embodiment, the device 500 may have received the clip during the contact window at the scheduled receive time. In another embodiment, the device 500 may not have received the clip during the contact window because it was out of range and not able to communicate over the network. If the device 500 successfully received the clip, the method proceeds to block 624. If the device was unable to receive the clip, the method proceeds to block 626.

At block 624, the received clip is stored at the device for later viewing. In an embodiment, the processing logic 502 operates to store the clip in the memory 508. At some later presentation time, the processing logic 502 operates to retrieve the stored clip and rendered it on the device. If there are no more clips to receive, the method then ends at block 628. If there are more clips to receive the method proceeds to block 626.

At block 626, a test is performed to determine if the device needs to receive clip data in a subsequent contact window. For example, in an embodiment, if the device 500 receives the clip in the first contact window without any error, it can go back to sleep. Thus, if the clip is successfully received and then stored at block 624, the method proceeds to block 614 where the device returns to the power down mode to conserve power until the next scheduled receive time.

In another embodiment, if the clip is not successfully received or if additional clip data needs to be received, the method proceeds to block 620 to receive more clip data in a subsequent contact window. For example, the device 500 may stay awake or at least monitor a subsequent contact window to receive the clip data. Note that depending on the coding scheme being used for the clip, it is not necessary that the entire content clip be broadcast in every contact window associated with that clip. For example, different portions of a selected content clip can be broadcast over multiple contact windows. In addition, mobile devices need not to stay awake for an entire contact window. As long as a mobile device receives enough information to decode the clip correctly, it does not have to stay awake for the entire contact window.

Thus, the method 600 provides embodiments of a method for operating a device for use in a delivery system. It should be noted that the method 600 is just one implementation and that other implementations are possible within the scope of the embodiments. For example, any of the functions of the method 600 may be added to, changed, deleted, modified, combined, or otherwise adjusted within the scope of the embodiments.

Figure 7:
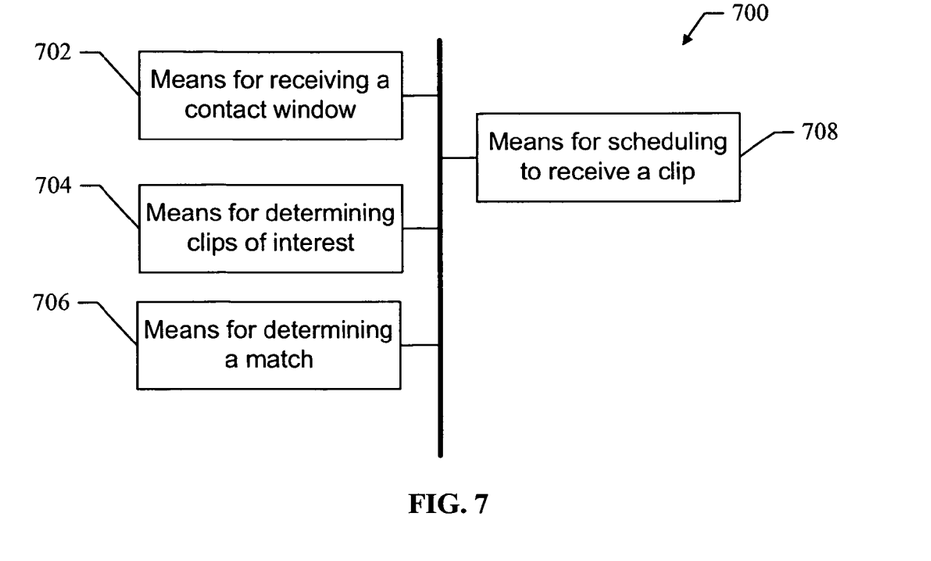
FIG. 7 shows an embodiment of a device suitable for use in a delivery system.

FIG. 7 shows an embodiment of a device 700 suitable for use in a delivery system. For example, the device 700 is suitable for use as the device 112 shown in FIG. 1.

The device 700 comprises means (702) for receiving a contact window, means (704) for determining clips of interest, means (706) for determining a match between a clip of interest and a selected clip, and means (708) for scheduling to receive a clip. In one or more embodiments, the means (702-708) are provided by at least one processor executing a computer program to provide the functions described herein.

Figure 8:
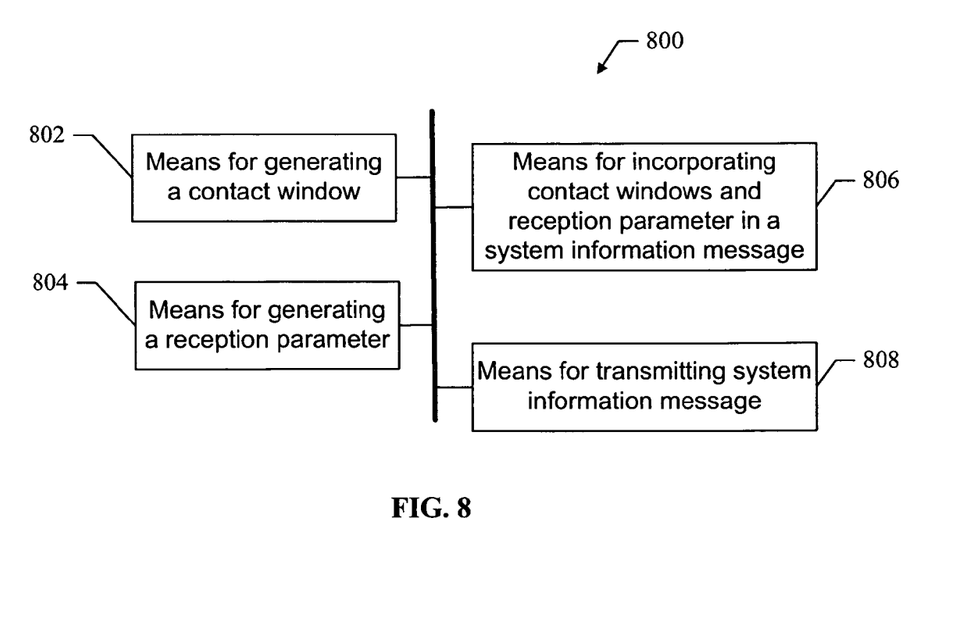
FIG. 8 shows an embodiment of a server suitable for use in a delivery system.

FIG. 8 shows an embodiment of a server 800 suitable for use in a delivery system. For example, the server 800 is suitable for use as the server 126 shown in FIG. 1.

The server 800 comprises means (802) for generating a contact window, means (804) for generating a reception parameter, means (806) for incorporating a contact window and a reception parameter into a system information message, and means (808) for transmitting a system information message. In one or more embodiments, the means (802-808) are provided by at least one processor executing a computer program to provide the functions described herein.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a delivery system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for providing a clip delivery schedule, the method comprising:
   by a wireless receiver device:
      receiving, via a broadcast, a contact window that describes a time during which a content clip will be available on a distribution network;
      receiving, via a broadcast, a reception parameter associated with the contact window, wherein the reception parameter indicates a time interval in the contact window during which the wireless receiver device should wake up from a low power mode to receive the content clip and indicates a portion of the contact window that is insufficient for the content clip to be successfully received and during which reception of the content clip should not be attempted;
      receiving, via a broadcast, a contact window duration time parameter;
      determining whether the content clip is of interest;
      determining whether the content clip can be successfully received within the time interval based on the contact window duration time parameter and the reception parameter indicating the portion of the contact window that is insufficient for the content clip to be successfully received and during which reception of the content clip should not be attempted; and
      scheduling a receive time within the time interval to receive the content clip in response to determining that the content clip is of interest and that the content clip can be successfully received within the time interval based on the contact window duration time parameter and the reception parameter indicating the portion of the contact window that is insufficient for the content clip to be successfully received and during which reception of the content clip should not be attempted.

2. The method of claim 1, further comprising receiving the contact window in an information message.

3. The method of claim 1, further comprising conserving power until the receive time.

4. The method of claim 1, further comprising waking up from the low power mode at the receive time to receive the content clip.

5. The method of claim 1, further comprising determining whether one or more content clips are of interest based on at least one of an operator input and a device subscription status.

6. The method of claim 1, further comprising:
   determining one or more additional contact windows that describe when the content clip will be available on the distribution network; and
   receiving the content clip in at least one of the one or more additional contact windows.

7. A wireless receiver device for receiving a clip delivery schedule comprising:
   a processor configured with processor executable instructions to perform operations comprising:
      receiving, via a broadcast, a contact window that describes a time during which a content clip will be available on a distribution network;
      receiving, via a broadcast, a reception parameter associated with the contact window, wherein the reception parameter indicates a time interval in the contact window during which the wireless receiver device should wake up from a low power mode to receive the content clip and indicates a portion of the contact window that is insufficient for the content clip to be successfully received and during which reception of the content clip should not be attempted;
      receiving, via a broadcast, a contact window duration time parameter;
      determining whether the content clip is of interest;
      determining whether the content clip can be successfully received within the time interval based on the contact window duration time parameter and the reception parameter indicating the portion of the contact window that is insufficient for the content clip to be successfully received and during which reception of the content clip should not be attempted; and
      scheduling a receive time within the time interval to receive the content clip in response to determining that the content clip is of interest and that the content clip can be successfully received within the time interval based on the contact window duration time parameter and the reception parameter indicating the portion of the contact window that is insufficient for the content clip to be successfully received and during which reception of the content clip should not be attempted.

8. The device of claim 7, wherein the processor is configured with processor executable instructions to perform operations further comprising receiving the contact window in an information message.

9. The device of claim 7, wherein the processor is configured with processor executable instructions to perform operations further comprising conserving power until the receive time.

10. The device of claim 7, wherein the processor is configured with processor executable instructions to perform operations further comprising waking up from the low power mode at the receive time to receive the content clip.

11. The device of claim 7, wherein the processor is configured with processor executable instructions to perform operations further comprising determining if one or more content clips are of interest based on at least one of an operator input and a device subscription status.

12. The device of claim 7, wherein the processor is configured with processor executable instructions to perform operations further comprising:
   determining one or more additional contact windows that describe when the content clip will be available on the distribution network; and
   receiving the content clip in at least one of the one or more additional contact windows.

13. A wireless receiver device for receiving a clip delivery schedule comprising:
   means for receiving, via a broadcast, a contact window that describes a time during which a content clip will be available on a distribution network;
   means for receiving, via a broadcast, a reception parameter associated with the contact window, wherein the reception parameter indicates a time interval in the contact window during which the wireless receiver device should wake up from a low power mode to receive the content clip and indicates a portion of the contact window that is insufficient for the content clip to be successfully received and during which reception of the content clip should not be attempted;
   means for receiving, via a broadcast, a contact window duration time parameter;
   means for determining whether the content clip is of interest;
   means for determining whether the content clip can be successfully received within the time interval based on the contact window duration time parameter and the reception parameter indicating the portion of the contact window that is insufficient for the content clip to be successfully received and during which reception of the content clip should not be attempted; and
   means for scheduling a receive time within the time interval to receive the content clip in response to determining that the content clip is of interest and that the content clip can be received within the time interval based on the contact window duration time parameter and the reception parameter indicating the portion of the contact window that is insufficient for the content clip to be successfully received and during which reception of the content clip should not be attempted.

14. The device of claim 13, wherein means for receiving the contact window comprises means for receiving the contact window in an information message.

15. The device of claim 13, further comprising means for conserving power until the receive time.

16. The device of claim 13, further comprising means for waking up from the low power mode at the receive time to receive the content clip.

17. The device of claim 13, wherein means for determining that the content clip is of interest comprises means for determining that the content clip is of interest based on one or both of an operator input and a device subscription status.

18. The device of claim 13, further comprising:
   means for determining one or more additional contact windows that describe when the content clip will be available on the distribution network; and
   means for receiving the content clip in at least one of the one or more additional contact windows.

19. A non-transitory computer readable storage medium having stored thereon processor executable software instructions configured to cause a processor in a wireless receiver device to perform operations comprising:
   receiving, via a broadcast, a contact window that describes a time during which a content clip will be available on a distribution network;
   receiving, via a broadcast, a reception parameter associated with the contact window, wherein the reception parameter indicates a time interval in the contact window during which the wireless receiver device should wake up from a low power mode to receive the content clip and indicates a portion of the contact window that is insufficient for the content clip to be successfully received and during which reception of the content clip should not be attempted;
   receiving, via a broadcast, a contact window duration time parameter;
   determining whether the content clip is of interest;
   determining whether the content clip can be successfully received within the time interval based on the contact window duration time parameter and the reception parameter indicating the portion of the contact window that is insufficient for the content clip to be successfully received and during which reception of the content clip should not be attempted; and
   scheduling a receive time within the time interval to receive the content clip in response to determining that the content clip is of interest and that the content clip can be received within the time interval based on the contact window duration time parameter and the reception parameter indicating the portion of the contact window that is insufficient for the content clip to be successfully received and during which reception of the content clip should not be attempted.

20. The non-transitory computer readable storage medium of claim 19, wherein the stored processor executable software instructions are configured to cause the processor to perform operations such that receiving the contact window is received in an information message.

21. The non-transitory computer readable storage medium of claim 19, wherein the stored processor executable software instructions are configured to cause the processor to perform operations further comprising conserving power until the receive time.

22. The non-transitory computer readable storage medium of claim 19, wherein the stored processor executable software instructions are configured to cause the processor to perform operations further comprising waking up from the low power mode at the receive time to receive the content clip.

23. The non-transitory computer readable storage medium of claim 19, wherein the stored processor executable software instructions are configured to cause the processor to perform operations such that determining that the content clip is of interest based on one or both of an operator input and a device subscription status.

24. The non-transitory computer readable storage medium of claim 19, wherein the stored processor executable software instructions are configured to cause the processor to perform operations further comprising:
   determining one or more additional contact windows that describe when the content clip will be available on the distribution network; and
   receiving the content clip in at least one of the one or more additional contact windows.

* * * * *